United States Patent
DeLuga et al.

(10) Patent No.: US 7,139,168 B2
(45) Date of Patent: Nov. 21, 2006

(54) DOCKING STATION

(75) Inventors: Ronald E. DeLuga, Spring, TX (US); Earl Moore, Cypress, TX (US); Paul Walker, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/975,872

(22) Filed: Oct. 28, 2004

(65) Prior Publication Data

US 2006/0092605 A1    May 4, 2006

(51) Int. Cl.
*G06F 1/16* (2006.01)
*H05K 7/02* (2006.01)

(52) U.S. Cl. ............... 361/686; 710/102; 439/376; 381/801

(58) Field of Classification Search ........ 361/724–727, 361/679–687, 801, 802; 710/102; 439/341, 439/372, 376, 928.1
See application file for complete search history.

(56) References Cited

U.S. PATENT DOCUMENTS

| | | | | |
|---|---|---|---|---|
| 6,366,458 B1 * | 4/2002 | Yoshida et al. | ............. | 361/686 |
| 6,549,416 B1 * | 4/2003 | Sterner et al. | ............. | 361/727 |
| 6,643,127 B1 * | 11/2003 | Richardson | ............. | 361/686 |

* cited by examiner

*Primary Examiner*—Hung Van Duong

(57) ABSTRACT

One exemplary docking station has a surface for receiving a portable computer, with a wall and a latch projecting from the receiving surface. The latch is movable towards and away from the wall, is resiliently biased towards the wall, and has an overhang that can engage a striker plate of a portable computer when the latch is moved towards the wall, so that the overhang restrains the striker plate against movement away from the receiving surface. The overhang can release the striker plate when the latch is moved away from the wall. A release actuator operable by a user engages the latch so that operation of the release actuator causes the latch to move away from the wall.

24 Claims, 4 Drawing Sheets

DOCKING STATION

BACKGROUND

Battery powered portable computers, sometimes known as "notebook" or "laptop" computers, are usually designed to be substantially self-contained, so that they can be used wherever they and their user happen to be. However, in some instances a user may wish to attach external devices to the portable computer. For example, the portable computer may be connected to any or all of a CRT monitor, a mouse, a 104-key keyboard, a network adapter, and a power supply.

To make it easier to attach and remove these external devices, a "docking station" or "port replicator" may be provided. The external devices and the portable computer can be separately connected to and removed from the docking station. The docking station typically has one or more latches to hold the computer in position, and one or more connectors that, when the computer is latched in place, mate with a corresponding connector in the computer to provide connection paths through the docking station to the external devices.

DETAILED DESCRIPTION

Figure 1:
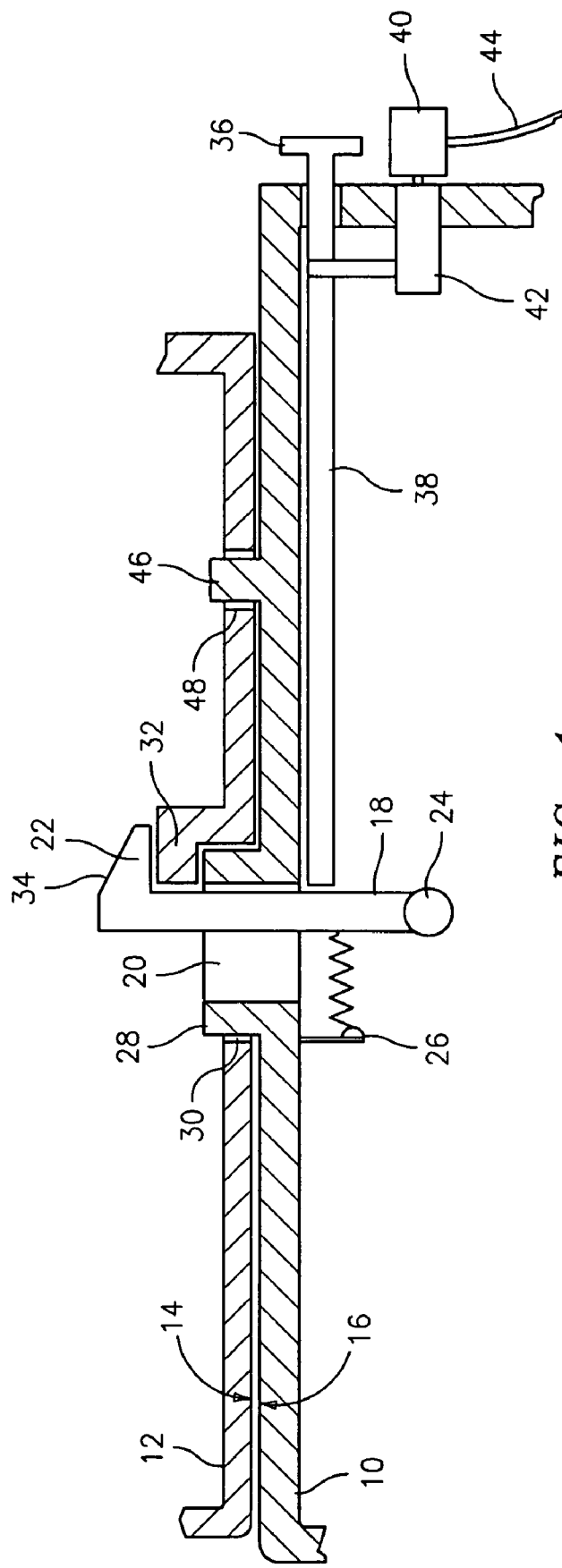
FIG. 1 is a schematic cross-section through a first embodiment of a docking station and computer in accordance with one embodiment of the invention.

Referring to the accompanying drawings, and initially to FIG. 1, a first embodiment of a docking station 10 according to the invention is designed to receive an embodiment of a portable computer 12 according to the invention. One side 14 of the portable computer, shown as the underside, is placed against a support surface 16 of the docking station 10. In this description, words such as "upper," "lower," "raise," "on," and "underside" that imply a specific orientation are used with reference to the orientation shown in FIGS. 1 and 4 of the drawings. However, it will be understood that the embodiments of docking station shown in the drawings may be used in other orientations.

A latch 18 extends through an opening, which in the embodiment is in the form of a slot 20, in the support surface 16 of the docking station 10. The latch 18 has a beak 22 projecting sideways. The latch 18 is attached to the docking station 10 by a pivot 24, and is movable within the slot 20 between a locking position (shown in FIG. 1) in which the beak 22 projects beyond the end of the slot 20 and an unlocking position in which the beak is above the slot 20. The latch 18 is urged into the locking position by a biasing member, such as spring 26.

The slot 20 is surrounded by a rib 28. A clearance or space extends between a side of the beak 22 of the latch 18 towards the support surface 16 and a side of the rib 28 away from the support surface.

The underside 14 of the portable computer 12 has an opening 30 that is dimensioned to fit round the rib 28, so that when the underside of the portable computer is positioned on the support surface of the docking station 10, the rib 28 projects into the opening 30. On one side of the opening 30 is a striker plate 32 that overhangs the rib 28. The beak 22 of the latch overhangs the striker plate in the locking position of the latch.

The beak 22 of the latch 18 has on its side away from the support surface 16 a cam surface 34. The cam surface 34 is angled so that, if the portable computer 12 is placed into position on the docking station 10, the side of the striker plate 32 facing the support surface 16 will engage the cam surface 34 and push the latch 18 into its unlocking position against the action of the spring 24. This movement of the latch 18 allows the portable computer 12 to be placed on the docking station 10 without the latch 18 having to be manually released. Once the computer 12 is in a docked position, the spring 24 returns the latch 18 to the locking position. The side of the beak 22 facing the support surface 16 and the side of the striker plate 32 away from the support surface 16 are not angled. As a result, the latch 18 cannot be released merely by pulling the computer 12 away from the docking station 10.

In order to release the computer 12 from the docking station 10, the docking station is provided with a release button 36. When the release button 36 is pressed, a pushrod 38 deflects the latch 18 into the unlocking position, allowing the computer 12 to be removed from the docking station 10. The pushrod 38 is not attached to the latch 18 so if the latch is deflected by placing the computer 12 onto the docking station, the pushrod 38 does not move.

The pushrod 38 is provided with a key-operated lock 40 that in one position prevents, and in another position permits, using the release button 36 to deflect the latch 18. Thus, even with the lock 40 locked, a user can place the computer 12 onto the docking station 10. The latch 18 is deflected by the striker plate 32 engaging the cam surface 34 of the beak 22. Once the computer 12 is in a docked position, the spring 26 returns the latch 18 to the locking position, with the beak 22 above the striker plate 32. In order to release the computer 12, the user must use a key to unlock the lock 40 and permit actuation of the release button 36.

As shown in FIG. 1, the key-operated lock 40 may be an external device that when locked both disables the pushrod 38 by blocking an interlock mechanism 42 within the docking station 10 and secures the docking station 10 by a tether 44. It is thus desirable to keep the lock 40 secured even when the portable computer 12 is not present. With the embodiment of the docking station shown in FIG. 1, if the user relocks the lock 40 immediately after removing the computer 12, then the user does not need to use the key again when returning the computer 12 to the docking station. Thus, a user who leaves the docking station locked when the computer 12 is absent uses the key on fewer occasions than a user who locks the docking station only when the computer 12 is present. By offering a reduction in the use of a key, the embodiment of the portable computer shown in FIG. 1 encourages the user to relock the lock 40 immediately after removing the computer 12. The conscientious user who would in any case have relocked the docking station after removing the computer experiences a reduction in inconvenience as compared with an arrangement where the lock 40 must be unlocked and locked manually each time, and there is a corresponding reduction in wear and tear on the lock mechanism itself.

The lock 40 does not lock the latch 18. The lock 40 locks only the pushrod 38, leaving the latch 18 free to move against the spring 26. Because the latch 18 is free to move, the computer 12 could be released by pushing the latch 18 back in some other way, for example, by introducing some tool between the support surface 16 of the docking station 10 and the underside 14 of the portable computer. However, the rib 28 obstructs any attempt to push the latch 18 back by inserting such a tool.

Displacing the entire portable computer 12 over the support surface 16, from left to right as seen in FIG. 1 could disengage the computer from the latch 18. Engagement of the rib 28 with the periphery of the opening 30 may prevent movement of the computer 12 on the support surface 16. If the engagement of the rib 28 in the opening 30 is not considered sufficient to prevent movement of the computer 12 on the support surface 16, other structures may be provided to prevent movement of the computer on the support surface. As an example of such a structure, in FIG. 1 a peg 46 is shown projecting from the support surface 16 into a hole 48 in the side 14 of the portable computer 12.

Figure 2:
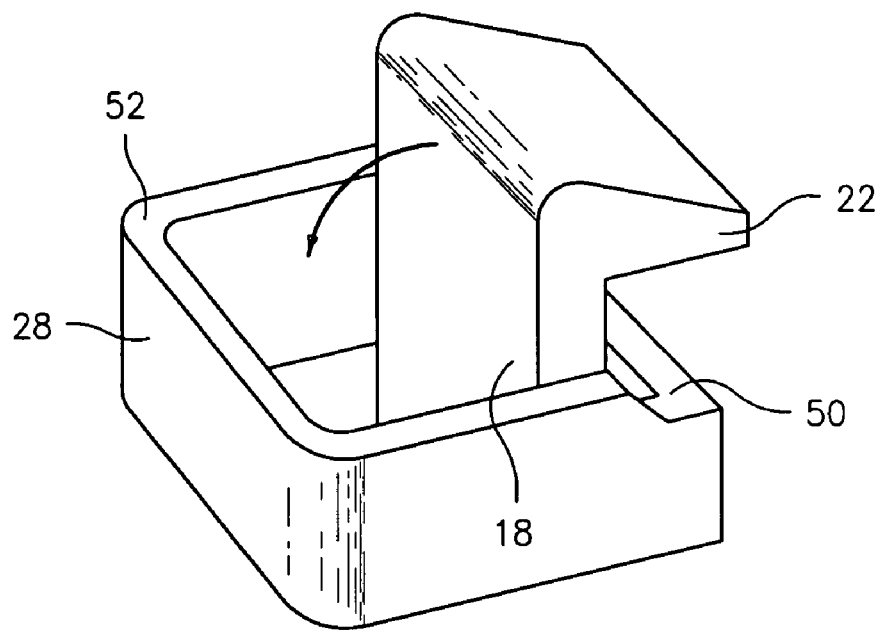
FIG. 2 is a somewhat schematic cut-away perspective view of a docking latch structure in accordance with an embodiment of the invention.
Figure 3:
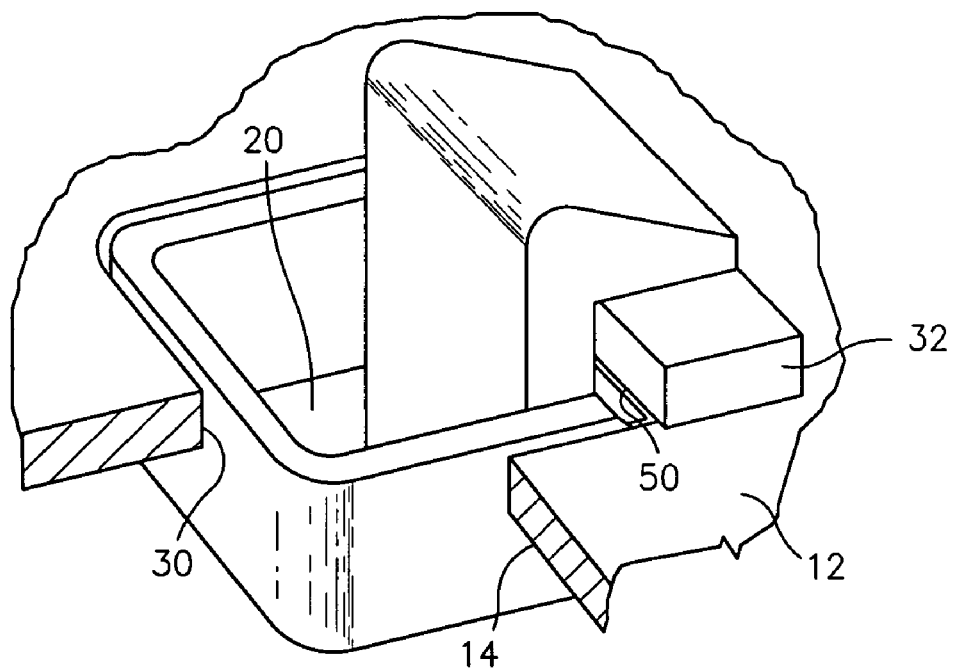
FIG. 3 is a view similar to FIG. 2 showing the docking latch of FIG. 2 engaged in a portable computer in accordance with an embodiment of the invention.

Referring now to FIGS. 2 and 3, in one embodiment of a docking latch structure, the rib 28 forms a generally rectangular wall round the slot 20. The wall 50 forming the side of the rib 28 over which the beak 22 of the latch 18 projects is lower than the wall 52 round the other three sides. As shown in FIG. 2, the taller wall 52 is flush with, or projects into the interior of the portable computer 12 slightly beyond, the wall forming the side 14 of the portable computer. As shown in FIG. 3, the less tall wall 50 fits with a slight clearance under the striker plate 32. In this embodiment, the side of the striker plate 32 facing towards the support surface 16 is flush with the inner surface of the wall forming the surface 14 of the portable computer 12. The striker plate 32 may then be a separate piece of material spanning one side of the opening 30.

Figure 4:
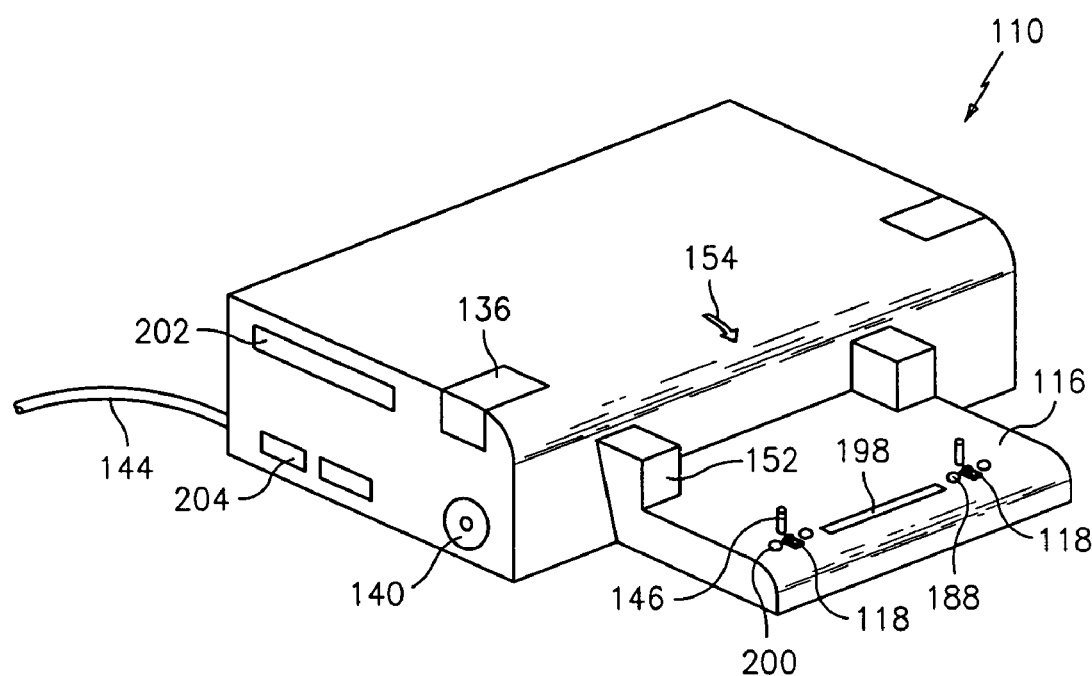
FIG. 4 is an oblique view of a second embodiment of a docking station in accordance with another embodiment of the invention.
Figure 5:
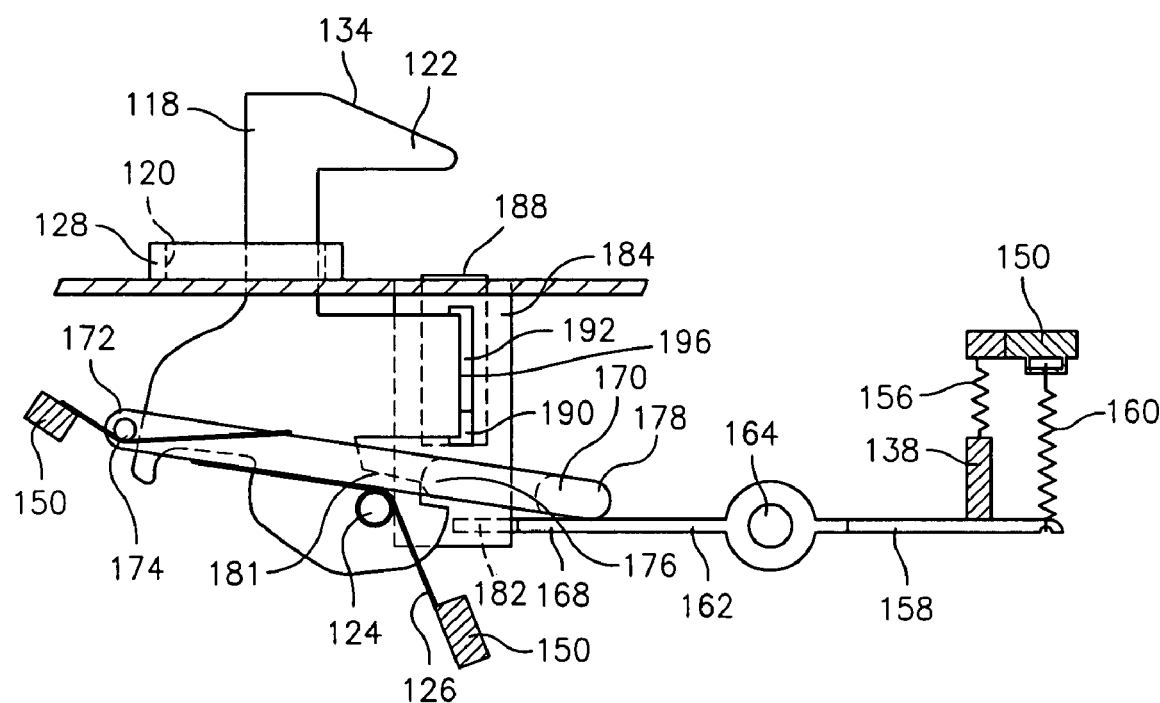
FIG. 5 is a partly schematic sectional view, partly cut away, showing a docking latch of the docking station shown in FIG. 4.
Figure 6:
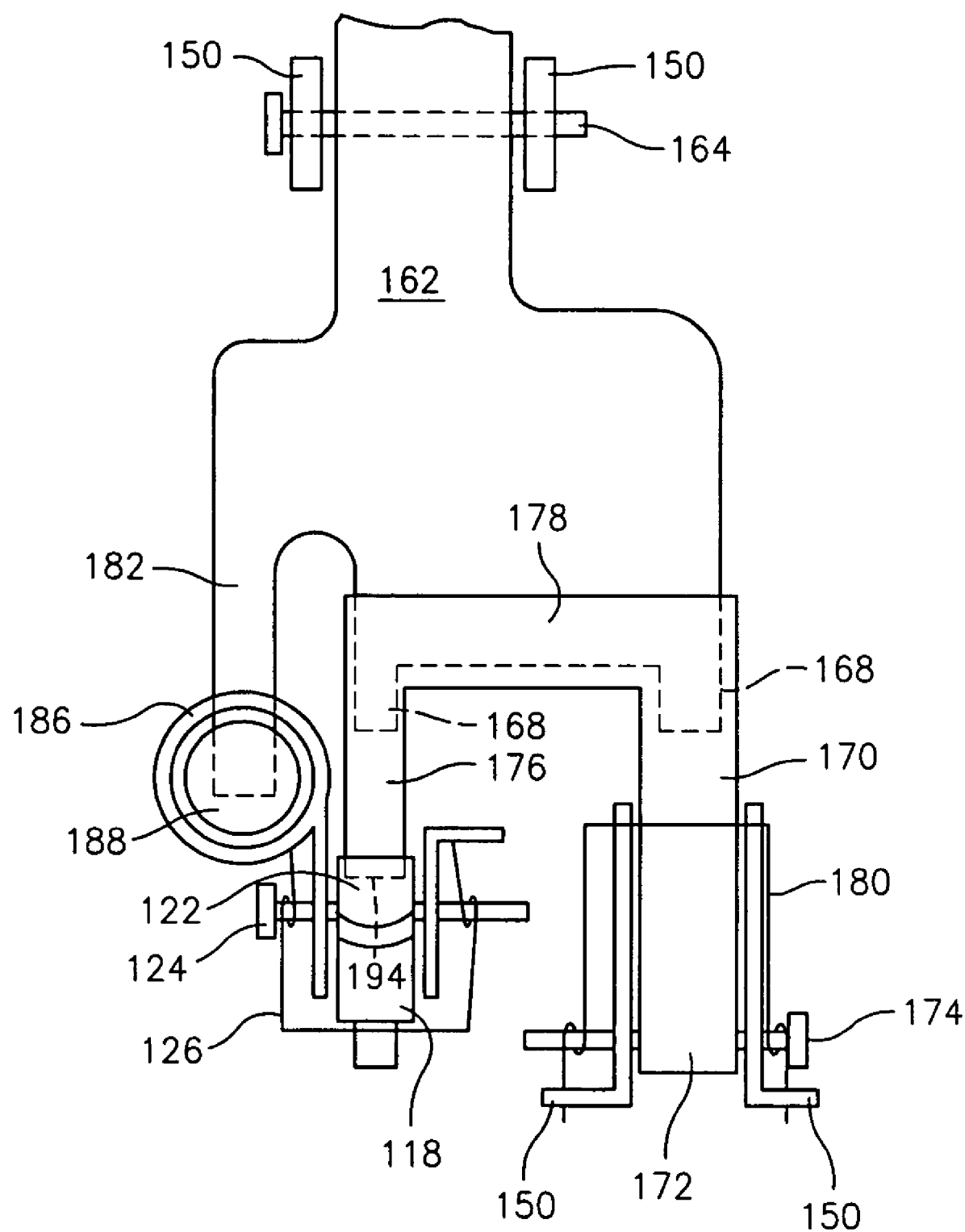
FIG. 6 is a top view of part of the docking latch mechanism shown in FIG. 5.

Referring now to FIGS. 4 to 6, a second embodiment of a docking station, indicated generally by the reference number 110, has a support surface 116 on which the underside of a portable computer is arranged to be placed. Two latches 118, which may be similar to the latches 18 shown in FIGS. 2 and 3, extend through respective slots 120 in the support surface 116 of the docking station 110. Each latch 118 has a projecting beak 122. Each latch 118 is attached to the docking station 110 by a pivot 124, and is movable within the slot 120 between a locking position (shown in FIG. 5) in which the beak 122 projects beyond the end of the slot 120 and an unlocking position in which the beak is above the slot 120. The latch 118 is urged into the locking position by a biasing member, such as a spring 126. The pivot 124 and the spring 126 are mounted on framing 150 integral with, or securely attached to, the casing of the docking station 110. In the interests of clarity, parts of the framing 150 that serve merely to support other components are omitted from FIG. 5 where they would obscure the view of functional components.

The slot 120 is surrounded by a rib 128, which may be similar to the rib 28 shown in FIGS. 2 and 3. Where the beak 122 of the latch 118 overhangs the rib 128, there is a clearance between them.

As shown in FIG. 4, the support surface 116 is provided with two upright, cylindrical posts 146 near to the latches 118, and with two upright abutments 152 at the rear of the support surface 116. A corresponding portable computer may be provided with a pair of holes similar to the hole 48 shown in FIG. 1. The holes and the openings 30 may be positioned relative to each other and to the rear of the case of the personal computer so that when the rear of the computer is centered against the abutments 152 the holes 48 will fit over the posts 146 and the openings 30 will then be correctly aligned with the latches 118. Centering marks 154 may be provided on the docking station 110 and the computer to assist the user in centering the computer laterally.

The docking station is provided with a release button 136 at one side of the docking station 110 that can be pressed down by the user. Referring now also to FIG. 5, the release button 136 is connected to a lever 138 extending across the docking station 110 and held up by a spring 156. At the middle of the width of the docking station 110, the lever 138 lies over the rear end of a lever 158, which is held up by a spring 160. The lever 158 is forked, with arms 162 extending symmetrically to the two latches 118, and is pivoted about a pair of coaxial pivots 164, one in each arm, mounted on the framing 150. This arrangement makes it possible for the arms 162 to deliver equal and symmetrical operating forces and motions to the two latches 118 even though the mechanism is operated by a single release button 136 at one side of the docking station 110.

Referring now also to FIG. 6, each arm 162 has a pair of fingers 168 that engage a J-shaped actuator 170. The actuator 170 has a long arm 172 that is pivoted to the framing 150 at a pivot 174, a short arm 176 that engages the latch 118, and a cross member 178 that connects the arms 172 and 176. The actuator 170 is made from a plastic material that will flex elastically. The actuator 170 is held down by a torsion spring 180 wound around the pivot 174. In the rest position of the docking station, the actuator 170 lies on the fingers 168 of the lever 158.

The tip of the short arm 176 of the actuator 170 engages in a notch 181 on the latch 118, below the beak 122 and roughly level with the pivot 124.

A third finger 182 on each arm 162 of the lever 158 extends into an upright cylindrical housing 184 through a slot 186 in one side of the housing. The housing 184 opens out through the support surface 116 of the docking station 110. The housing 184 contains a cylindrical plunger 188 that is guided, and held captive, by a lug 190 on one side sliding in a longitudinal slot 192 in the housing 184. In the rest position, as shown in FIG. 5, the top of the plunger 188 is approximately flush with the support surface 116. The plunger 188 is then supported, by the lug 190 resting on the bottom end of the slot 192, above and spaced from the finger 182.

In order to release the portable computer from the docking station 110, a user presses down on the release button 136. This pushes down the lever 138 against the spring 156. The lever 138 then pushes down the rear end of the lever 158 against the spring 160, which raises the fingers 168, 182. The fingers 168 of each arm 162 raise the actuator 170, with the pivot 174 acting as a hinge. The tip 194 of the short arm 176 of the actuator 170 pushes on the upper face of the notch 181, rocking back the latch 118. The length of the short arm 176 is set so that, when the latch 118 is fully pushed back into its released position, the tip of the short arm 176 snaps out of the notch 181 and rests against an upright face 196 of the latch 118 above the notch. The latch then remains locked in its released position until the user releases the release button 136, allowing the release mechanism to return to its rest position under the action of the springs 156, 160, and 180, lowering the short arm 176 until the tip 194 re-enters the notch 181, allowing the spring 126 to return the latch 118 to the latched position.

As the fingers 182 rise, they raise the plungers 188, which push the portable computer up, away from the support surface 116. Because, in the rest position, there is a space between the fingers 182 and the bottoms of the plungers 188, the fingers 168 can move the actuators 170 and the latches 118 before the plungers 188 start to rise. This sequence of movement allows the latches 118 to release, reducing the risk that the plungers will press the striker plates 32 against the undersides of the beaks 122 and create friction that will prevent the latches releasing.

However, when the release button is pressed, either latch 118 may be prevented from moving, for example, because the top of the striker plate 32 is pressing against the underside of the beak 22, or because the side of the opening 30 presses against the side of the latch 118. The release mechanism will then move until, and only until, the plungers 188 abut the underside 14 of the computer 12. In that case, the actuator 170 twists as the fingers 168 raise the actuator, storing up force. An ordinary user, finding that pressing the release button 136 does not eject the portable computer 12 from the docking station 110, almost automatically shakes the computer slightly, which usually cures the problem, allowing the latches to snap free.

The upward movement of the portable computer 12 caused by the plungers 188 detaches an electrical connector 198 on the support surface 116 from a corresponding connector on the underside of the computer. The computer can now be lifted from the posts 146 and detached from the docking station. However, if the release button is released before the computer 12 is removed from the posts 146, the computer may drop back onto and re-engage with the electrical connector 198, and even re-engage the latches 118. To prevent re-engagement, the support surface 116 may be provided with spring-loaded supports 200 that exert a sufficient upward force to prevent the portable computer dropping back onto the connectors. In the embodiment shown in FIG. 4, the supports 200 may be EMI (electromagnetic interference) cones, which are metal components with rounded or conical tops that are electrically connected to grounded metal within the docking station 110 and are arranged to contact exposed metal connected to ground within the portable computer. The supports 200 thus establish an electrical connection between the grounds of the computer and the docking station 110 as long as the computer is docked, reducing the exposure of the combined system to EMI.

The beak 122 of each latch 118 has on its upper side a cam surface 134. The cam surface 134, like the cam surface 34 shown in FIGS. 2 and 3, is angled so that, if a portable computer with suitable openings and striker plates, which in the embodiment may be similar to the opening 30 and striker plate 32 shown in FIG. 1, is placed into position on the docking station 110, the undersides of the striker plates 132 will engage the cam surfaces 134 and push the latches 118 into their unlocking positions against the action of the springs 126. As may be seen from FIGS. 5 and 6, movement of the latches 118 into their unlocking positions moves the notches 181 away from the tips 194 of the short arms 176. There is no structure or mechanism that prevents this movement. This allows the portable computer to be placed on the docking station 110 without the latches 118 having to be manually released. Once the computer is in position, the springs 126 return the latches 118 to the locking position, with the tips 194 of the short arms 176 in the notches 181.

The undersides of the beaks 122 are not angled to form a cam surface, so the latch 118 cannot be released merely by lifting the computer away from the docking station 110.

The docking station 110 is provided with a key-operated lock 140 that in one position prevents, and in another position permits, using the release button 136 to deflect the latches 118. The lock 140 may slide a block under the lever 138, preventing the release button 136 from pushing down the lever 138 far enough to operate the release mechanism. However, the lock 140 does not prevent the latches 118 from deflecting. Thus, even with the lock 140 locked, a user can place a suitable computer onto the docking station 110. In order to release the computer, the user must use the key to unlock the lock 140 and permit the release button 136 to be used.

As shown in FIG. 4, the key-operated lock 140 may be an internal device. When locked, the lock 140 may disable the lever 138. The docking station 110 may be substantially permanently attached to a tether 144. The lock itself may be a standard security lock, from which the key can be removed only when the lock is in the locked position. It is thus desirable to keep the lock 140 secured even when the portable computer is not present, so that the key can be removed. The embodiment of the docking station 110 shown in FIGS. 4 to 6, like the embodiment shown in FIG. 1, encourages the user to relock the lock 140 and remove the key immediately after removing the computer, because the user then does not need to use the key again when returning the computer to the docking station.

Because the lock 140 does not lock the latches 118, but only the lever 138, the computer could be released by pushing the latches 118 back in some other way. However, as explained above with reference to FIGS. 2 and 3, the ribs 128 obstruct any attempt to push the latches 118 back by inserting a tool between the underside 14 of the portable computer and the support surface 116 of the docking station 110. In the embodiment shown in FIG. 4, any attempt to push the latches 118 with a tool is further hindered because the latches must be moved forward, so any tool must be inserted behind them, and because the latches are to some extent guarded by the posts 146, the electrical connector 198, and the EMI cones 200. In the embodiment shown in FIG. 4, any attempt to push the latches 118 forward with a tool is further hindered because the latches 118 move independently, so they must be pushed forward separately but simultaneously in order to release the computer.

Although the invention has been described and illustrated with reference to exemplary embodiments thereof, it will be understood by those skilled in the art that various changes, omissions, and additions may be made thereto, without departing from the spirit and scope of the invention as recited in the attached claims. For example, there may be only a single latch, as shown for the latch 18 in FIG. 1, or there may be two latches, as shown for the latches 118 in FIG. 4. If there are two latches 18, 118, they may be arranged to move parallel to one another, as shown in FIG. 4, or towards and away from each other, or in some other orientation. If there are two latches 18, 118 they may be operated by a single release button 136, as shown in FIGS. 4 to 6, through a suitable arrangement of pushrods 38, levers 138, or other mechanisms, or they may be operated by, for example, two release buttons.

The embodiments shown in the drawings have a continuous rib 28 surrounding the opening 20 in the docking station 10. This arrangement is both effective at preventing tampering with the latch 18 and esthetically pleasing. The wall 50 prevents the direct application of force to push back the latch 18, and the parts of the wall 52 immediately adjacent to the ends of the wall 50 prevent the insertion of a straight tool from the side between the wall 50 and the latch 18. The remaining parts of the wall 52 serve to prevent the insertion of more elaborately shaped tools. Depending on the level of security required, a rib 28 surrounding less than the whole circumference of the opening 20 is possible.

The embodiments shown in the drawings have a rectangular rib 28 fitting snugly within a rectangular opening 30 in the underside of the computer 12. This configuration serves to prevent the computer 12 from being slid sideways or rotated relative to the docking station 10, 110. If there are two latches 118 each with its rib 128, these will combine to prevent rotation. If the computer 12 can be moved relative to the docking station 10, 110, movement may facilitate disengagement of the latch or latches 18, 118 without releasing the lock 40, 140 and using the release button 36, 136. Additional structures such as the posts 46, 146 or the abutment surfaces 152 may be provided to locate and align the computer 12 relative to the docking station 10, 110. The number, shape, and position of such additional structures can be varied to suit any individual combination of a docking station and a computer. These additional structures may comprise guides that are provided to assist in aligning the computer 12 with the docking station 10 so that the computer can be placed over the latches 18, 118 and the ribs 28, 128.

One function of a docking station 10, 110 is to connect the portable computer 12 to various peripheral devices, network adapters, power supplies, and other attachments, which may be installed in the docking station in bays 202 (see FIG. 4) or attached to connectors 204 on the docking station. The bays 202, connectors 204, and the like are then connected to the electrical connector 198, and through the connector 198 to the computer 12. Such attachments come in a wide variety, and may be chosen to suit the particular computer 12.

Although the docking stations 10 and 110 have been described with reference to an orientation in which the support surface 16 or 116 faces generally upwards, and the surface 14 of the computer 12 in which the openings 30 are formed is the underside, it will be appreciated that the docking station 10 or 110 and/or the portable computer 12 may be in some other orientation. Furthermore, the orientation of the computer 14 when docked is not necessarily the same as its ordinary orientation in use when undocked. Thus, the surface 14 of the computer 12 in which the openings 30 are formed may be the underside when the computer is docked but not in an ordinary orientation of use when the computer is undocked, or may be the underside in an ordinary orientation of use when the computer is undocked but not when the computer is docked, or may be the underside in both conditions or in neither condition. Furthermore, the latches 18 may be in a different part of the docking station and may be arranged to engage some other part of the portable computer 12.

What is claimed is:

1. A docking station, comprising:
   a receiving surface for receiving a portable computer;
   a wall projecting from the receiving surface;
   a latch projecting from the receiving surface, wherein the latch is movable towards and away from the wall, is resiliently biased towards the wall, and has an overhang;
   wherein said overhang can engage a striker plate of the portable computer when said latch is moved towards the wall, said overhang restraining the striker plate against movement away from the receiving surface; and
   wherein said overhang can release the striker plate when said latch is moved away from the wall; and
   a release actuator operable by a user to cause the latch to move away from the wall.

2. A docking station according to claim 1, wherein the release actuator is arranged to be locked, wherein locking of the release actuator prevents operation of the release actuator to cause the latch to move away from the wall but locking of the release actuator does not prevent the latch moving away from the wall.

3. A docking station according to claim 1, further comprising a rib surrounding the latch and including said wall.

4. A docking station according to claim 1, further comprising a second latch and wall.

5. A docking station according to claim 4, further comprising a single said release actuator so engaging both said latches that operation of said single release actuator causes both said latches to move away from their respective said walls.

6. A docking station according to claim 4, wherein said latches are movable away from their respective walls independently of one another.

7. A combination of a docking station and personal computer, comprising:
   a receiving surface on the docking station for receiving the portable computer;
   a wall and a latch projecting from the receiving surface;
   an opening in the portable computer for receiving the wall and latch, having a striking surface for the latch;
   wherein the latch is movable towards and away from the wall and is resiliently biased towards the wall;
   wherein the latch has an overhang;
   wherein said overhang can engage the striking surface of the portable computer so that said latch restrains the computer in a docked position against movement away from the receiving surface,
   wherein said overhang releases the striking surface when said latch is moved away from the wall; and
   wherein the latch is arranged to deflect away from the wall to permit movement of the computer towards the receiving surface into the docked position; and
   a release actuator in the docking station operable by a user to cause the latch to move away from the wall.

8. A combination according to claim 7, wherein the release actuator is arranged to be locked, wherein locking of the release actuator prevents operation of the release actuator causing the latch to move away from the wall but does not prevent the latch deflecting away from the wall to permit movement of the computer towards the receiving surface into the docked position.

9. A combination according to claim 7, further comprising a lock that locks the release actuator and that is arranged to lock the docking station to an external structure.

10. A combination according to claim 7, wherein the docking station comprises a rib surrounding the latch and including said wall.

11. A combination according to claim 7, wherein the striking surface includes a striker plate that in the docked position overhangs said wall.

12. A combination according to claim 10, wherein the rib fits in said opening in the portable computer and prevents movement of said computer parallel to said receiving surface in the docked position.

13. A docking station comprising:
a supporting surface against which a portable computer can rest;
an opening in the supporting surface;
a rib surrounding the opening;
a latch projecting through the opening, and having a beak, the latch being movable between a latching position in which the beak overhangs the rib and an unlatching position in which the beak does not overhang the rib;
the latch being biased into the latching position;
a user-operable release member to move the latch into the unlatching position; and
a locking mechanism arranged to prevent operation of the release member without preventing movement of the latch.

14. A docking station according to claim 13, further comprising a second said latch surrounded by a second said rib.

15. A docking station according to claim 14, comprising a single said release member, wherein said single release member is user-operable to move both said latches into the unlatching position.

16. A docking station according to claim 14, wherein said latches are independently movable into the unlatching position.

17. A combination of a portable computer and a docking station, comprising:
a surface on the docking station for receiving the portable computer;
an opening in said surface;
a rib surrounding the opening;
a latch projecting through the opening, and having a beak, the latch being movable between a latching position in which the beak overhangs the rib and an unlatching position in which the beak does not overhang the rib;
the latch being biased into the latching position;
a user-operable release member to move the latch into the unlatching position;
a key-lockable locking mechanism arranged to prevent operation of the release member without preventing movement of the latch;
a socket in the portable computer arranged in a docking position to receive the rib and the latch; and
a striker plate in the socket positioned in the docking position to overhang the rib, to be overhung by the beak of the latch in the latching position, and to pass the beak in the unlatching position;
the striker plate and the beak being arranged to engage when the portable computer is moved into the docking position so as to move the latch into the unlatching position and allow the striker plate to pass the beak.

18. A combination according to claim 17, wherein the docking station further comprises a second said latch surrounded by a second said rib on the docking station.

19. A combination according to claim 18, comprising a single said release member so engaging both said latches that operation of said single release member moves both said latches into the unlatching position.

20. A combination according to claim 18, wherein said latches are independently movable into the unlatching position.

21. A docking station, comprising:
receiving means for receiving a portable computer;
engaging means for permitting said portable computer to move towards said receiving means, releasably engaging said portable computer, and preventing movement of said portable computer away from said receiving means;
releasing means for causing said engaging means to release said portable computer; and
means for preventing manipulation of said engaging means without using said releasing means to release said portable computer, wherein the means for preventing at least partially surrounds the engaging means.

22. A docking station according to claim 21, comprising means for locking said releasing means for preventing operation of the releasing means without preventing said engaging means permitting said portable computer to move towards said receiving means and releasably engaging said portable computer.

23. A combination of a docking station and personal computer, comprising:
receiving means on the docking station for receiving the portable computer;
engaging means on the docking station for permitting said portable computer to move towards said receiving means, releasably engaging said portable computer, and preventing movement of said portable computer away from said receiving means;
co-engaging means on the portable computer for co-operating with the engaging means releasably engaging said portable computer, and preventing movement of said portable computer away from said receiving means;
releasing means for causing said engaging means to release said portable computer; and
means for preventing manipulation of said engaging means without using said biasing means to release said portable computer, wherein the means for preventing at least partially surrounds the engaging means.

24. A combination according to claim 23, further comprising locking means for preventing operation of the releasing means without preventing said engaging means permitting said portable computer to move towards said receiving means and releasably engaging said portable computer.

* * * * *